Aug. 5, 1969    M. A. PAHLAVAN    3,460,127
DISPLAY APPARATUS

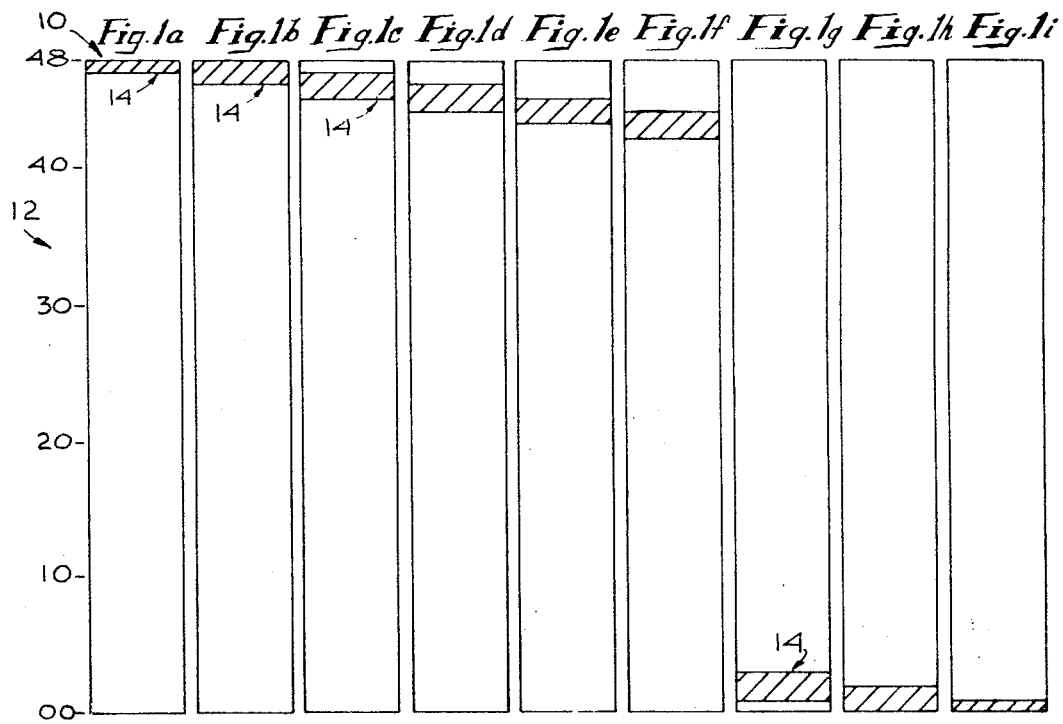
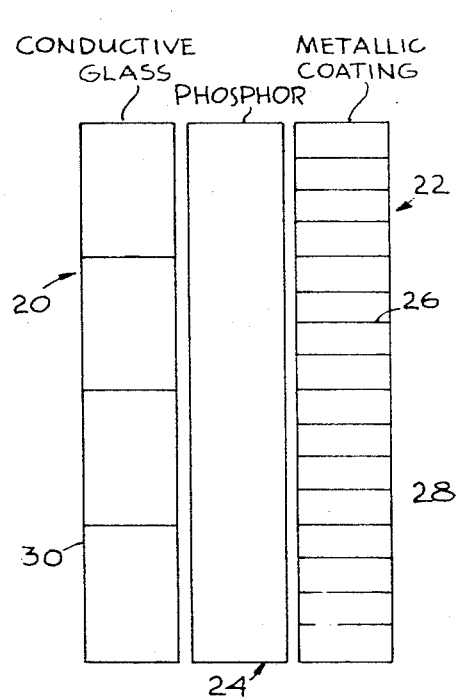
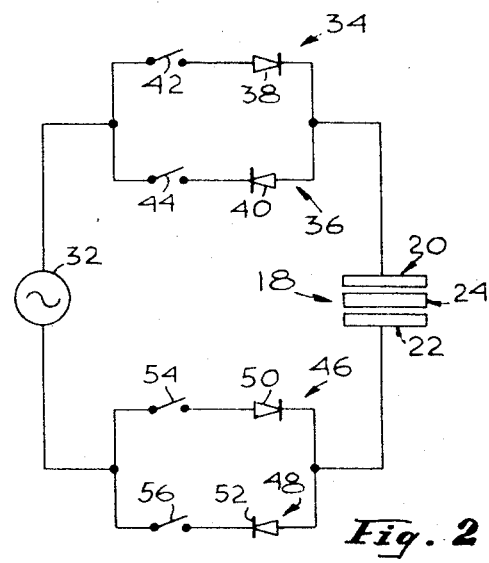

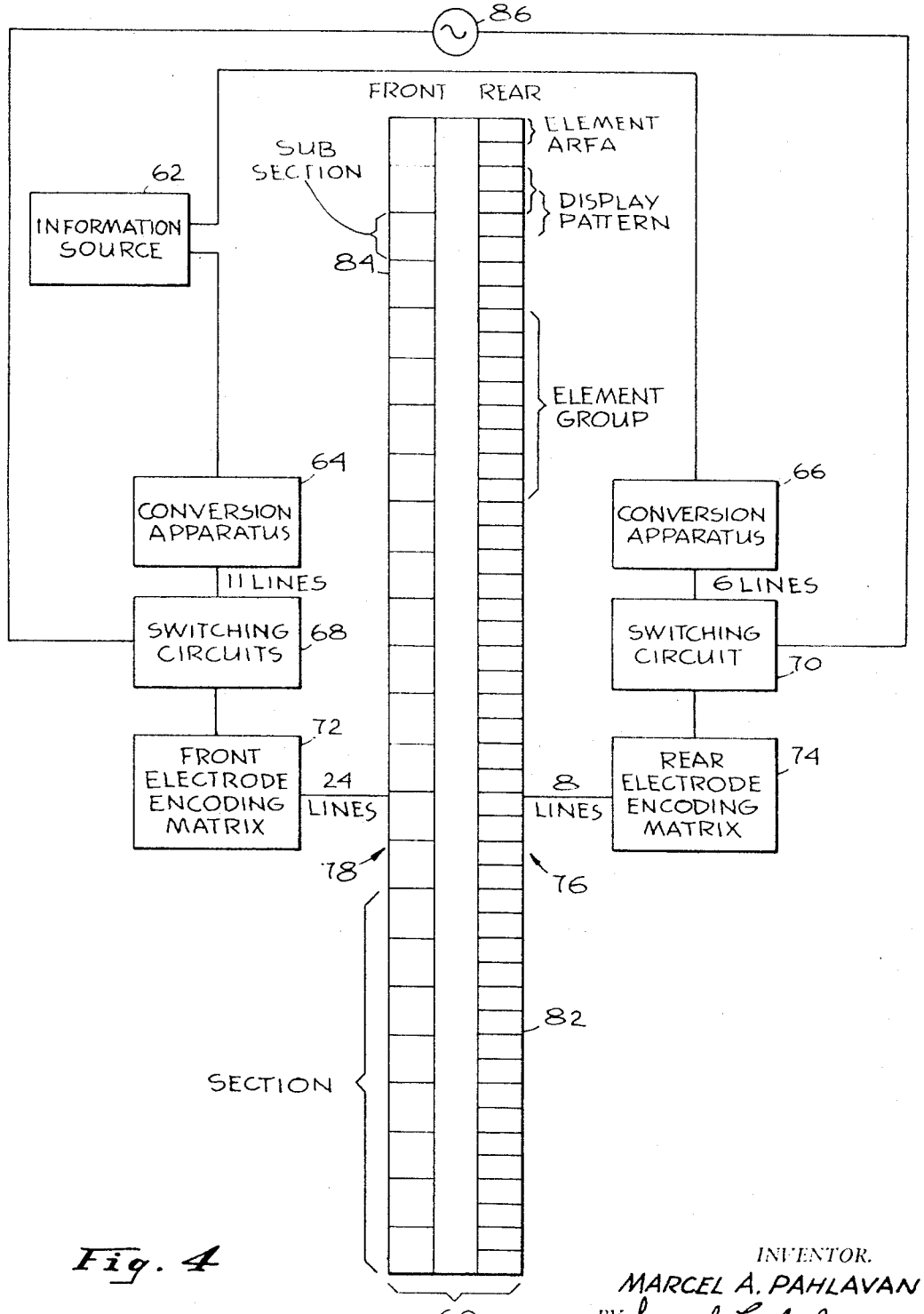

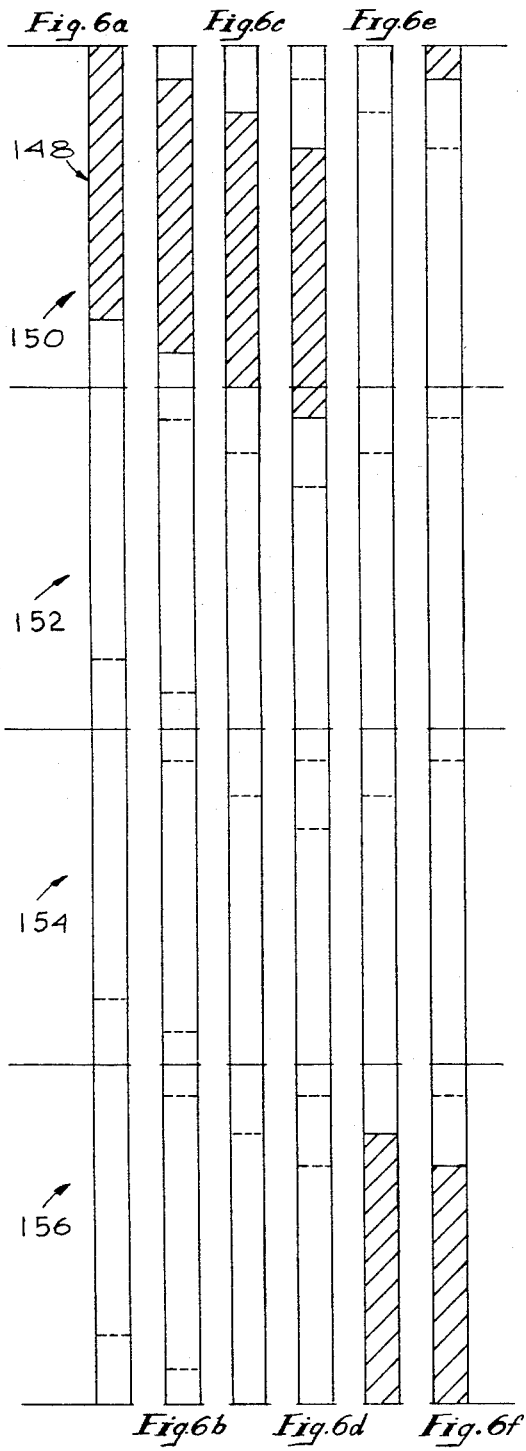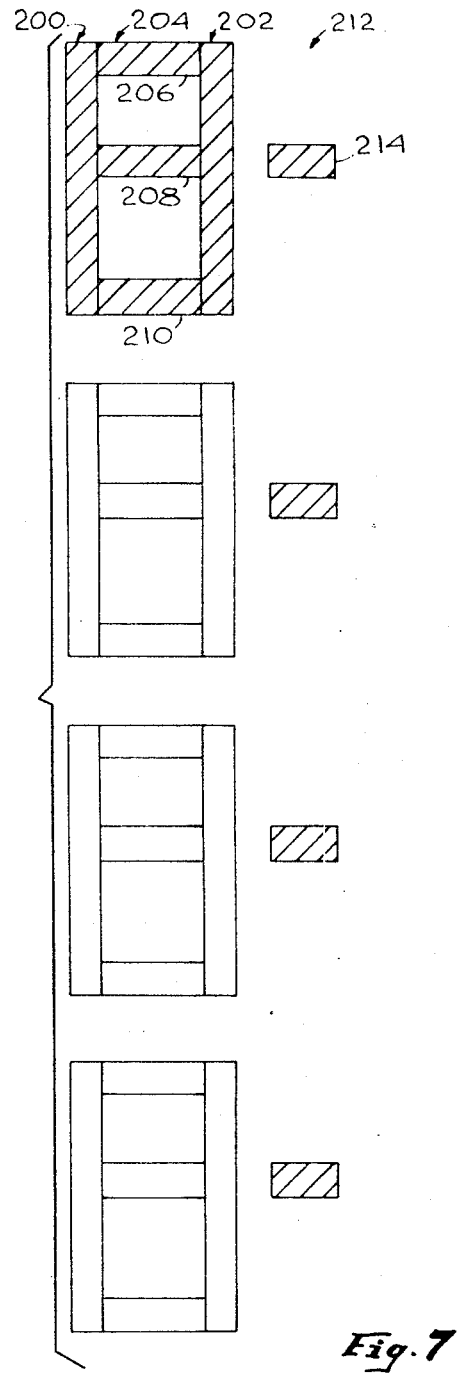

Filed Feb. 15, 1966    9 Sheets-Sheet 5

INVENTOR.
MARCEL A. PAHLAVAN
BY Samuel Lindenberg
Arthur Freilich
ATTORNEYS

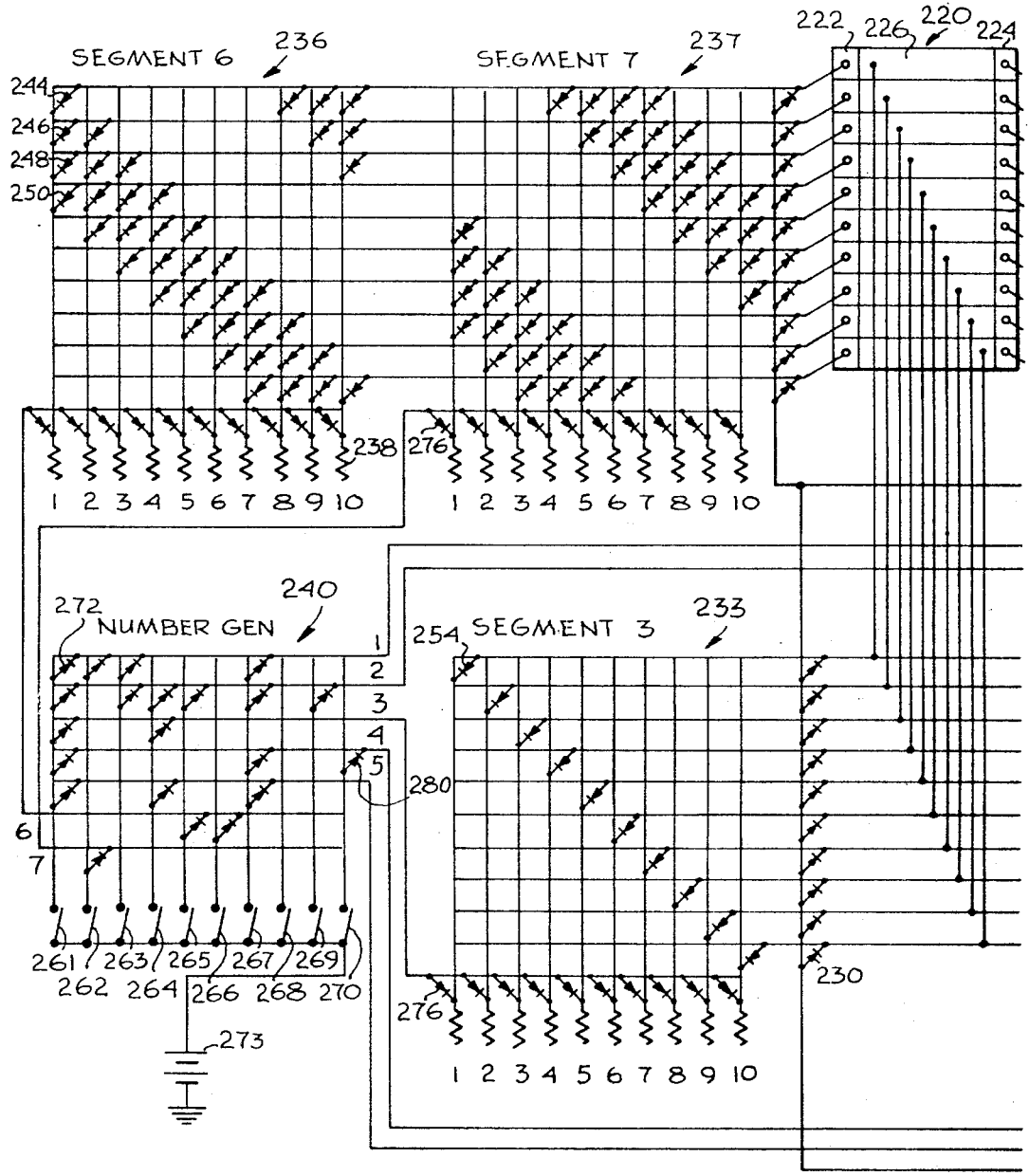
Fig. 9 (LEFT HALF)

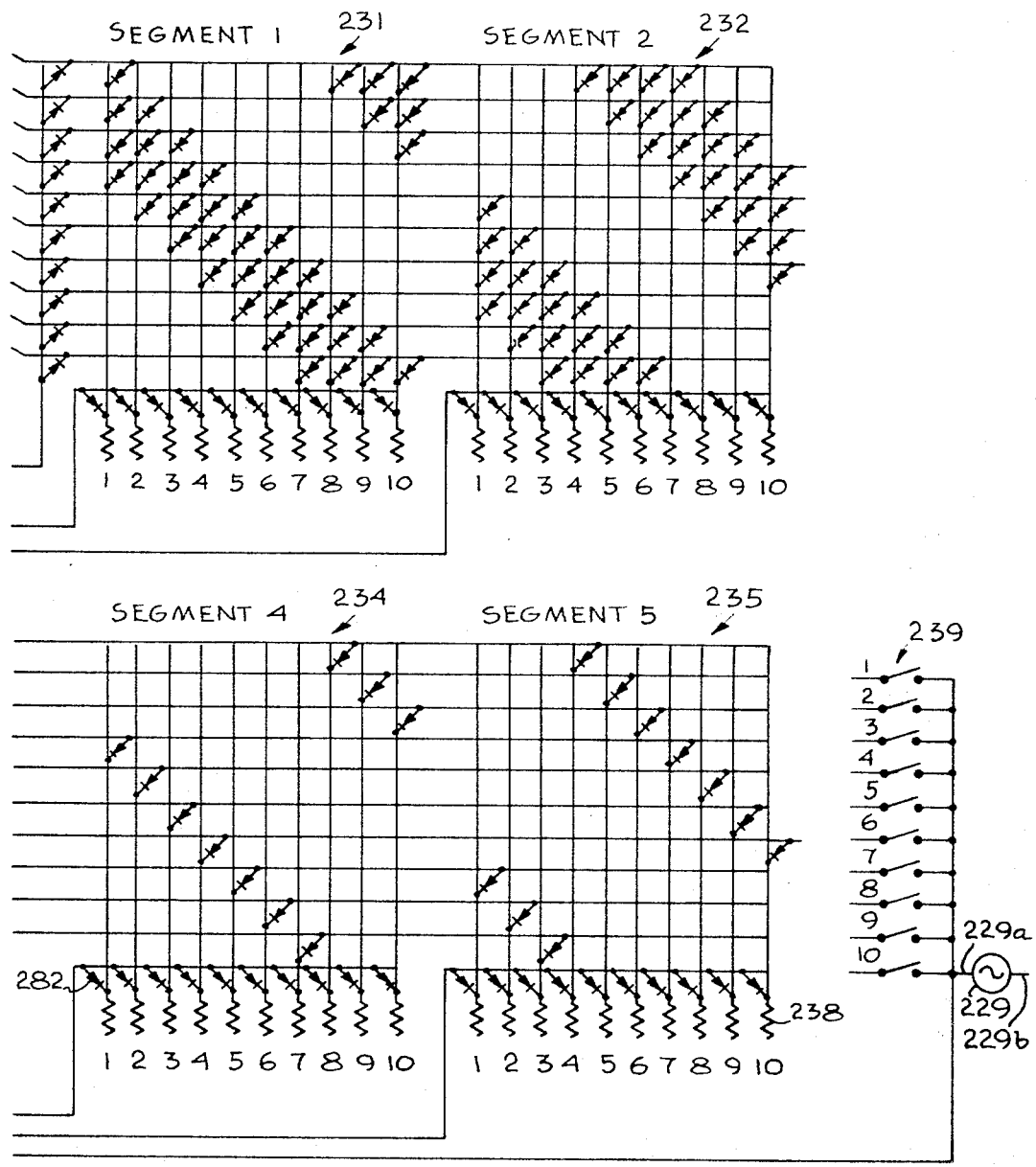
Fig. 9 (RIGHT HALF)

INVENTOR.
MARCEL A. PAHLAVAN
BY Samuel Lindenberg
Arthur Freilich
ATTORNEYS

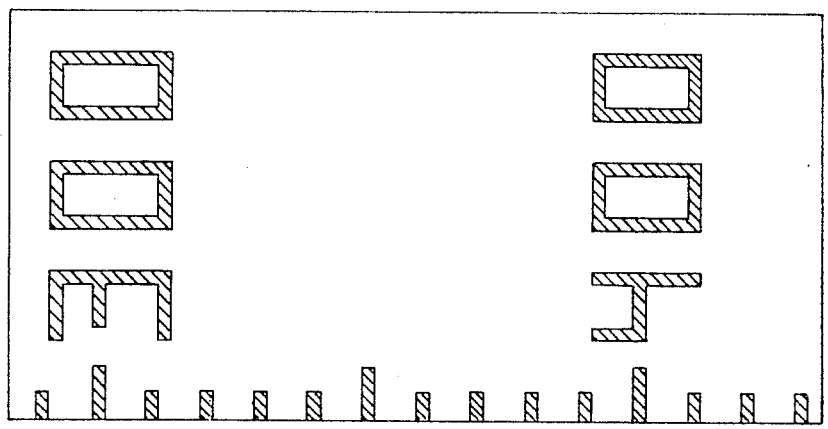
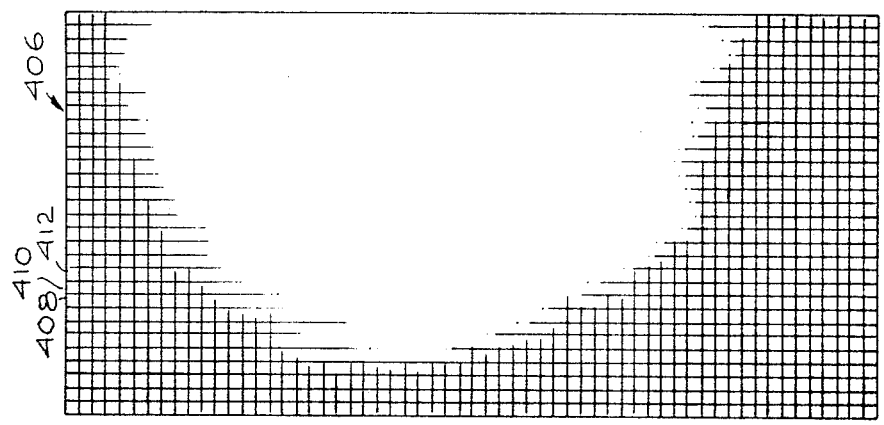
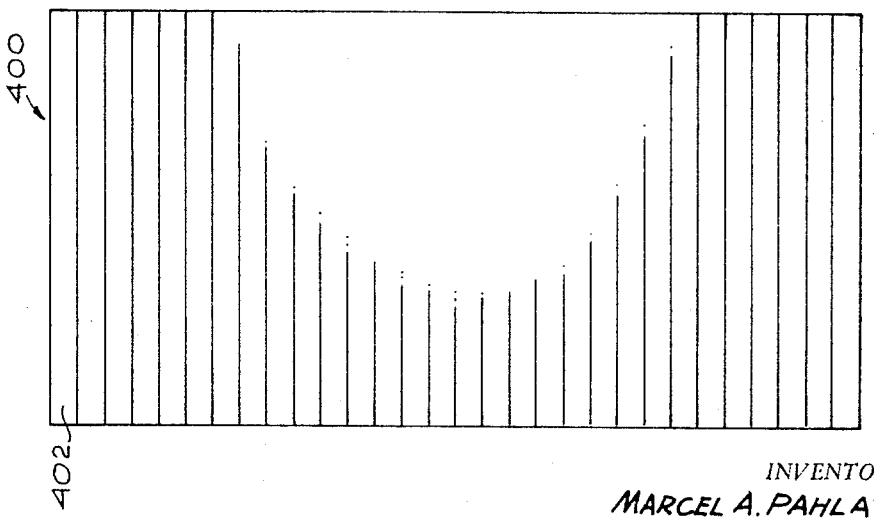

United States Patent Office 3,460,127
Patented Aug. 5, 1969

3,460,127
DISPLAY APPARATUS
Marcel A. Pahlavan, Los Angeles, Calif., assignor to Aerospace Products Research Corporation, Santa Monica, Calif., a corporation of California
Filed Feb. 15, 1966, Ser. No. 527,424
Int. Cl. G08b 25/00
U.S. Cl. 340—324                                    15 Claims

ABSTRACT OF THE DISCLOSURE

A solid state moving tape type display apparatus capable of displaying various patterns and apparently physically moving the displayed patterns by incremental distances considerably smaller than the dimension of the pattern. The apparatus is comprised of front and rear segmented electrode structures. The rear electrode structure is segmented to define a plurality of element areas and the front electrode structure is segmented to define areas, each of which overlays at least two rear electrode element areas. First and second encoding matrices are provided to respectively couple the first and second terminals of an alternating current source to the front and rear electrode structures. The encoding matrices are responsive to pattern and position information to cause anyone of several different patterns to be displayed in anyone of several different positions.

---

This invention relates generally to apparatus for displaying selected patterns and more particularly to such apparatus capable of causing apparent physical movement of the displayed patterns. Apparatus in accordance with the invention is useful, for example, as an output device for measuring instruments, data processing equipment, etc.

U.S. patent application Ser. No. 335,726, filed Jan. 6, 1964, now U.S. Patent No. 3,343,155, discloses a solid-state visual display device which is capable of simulating physical movement of a scale, a pointer, a bar graph, or other display patterns. Briefly, in accordance with a preferred embodiment of the cited patent application, physical scale movement is simulated by providing a plurality of numeric display blocks arranged in vertical alignment. Each display block includes a plurality of illuminable elements or segments which can be selectively illuminated to define a desired decimal digit. Moreover, two multi-digit decimal numbers, respectively representing high and low limits, can be displayed spaced vertically from one another to thereby define an observable scale. By energizing the display blocks in accordance with input information, such as a measured quantity, the displayed numbers will appear to physically move either up or down scale. An alternative embodiment of the aforecited patent application simulates the movement of a reference marker or pointer relative to a fixed scale. Other moving display patterns are also suggested.

Although the embodiments of the aforecited patent application do simulate physical movement very satisfactorily for many applications, close observation will of course reveal that successive display blocks are in actuality being energized in sequence. Since each display block has a height (assuming a vertical scale) sufficient to fully display the vertical dimension of the display pattern (e.g., a decimal digit), then movement of the pattern from one position or display block to the next has to be in increments equal to that height. For example, each display block could have a height slightly greater than one-quarter inch for displaying one-quarter inch digits. Twenty-four such display blocks could then be stacked to form a six-inch scale capable of simulating movement in one-quarter inch increments.

It is an object of the present invention to provide a display device capable of providing even better simulation of physical movement of a display pattern than has been provided heretofore. Moreover, it is an object of the present invention to provide an ultra-reliable display device capable of being fabricated relatively inexpensively.

Briefly, in accordance with the present invention, a display device is provided comprised of a series of contiguous identical illuminable elements. Display patterns are formed by illuminating one or more elements together. Electronic control apparatus is used to control the illumination of the elements in response to input information to enable the display pattern to appear to physically move. Although each display pattern can be comprised of several illuminable elements, the movement of the pattern is in increments equal to the dimension of a single element. For example, if quarter-inch digits are to be displayed, they can be comprised of eight elements each having a .030 inch dimension enabling the digit to be moved in .030 inch increments, rather than in quarter-inch increments.

In a preferred embodiment of the present invention, solid-state electroluminescent elements, requiring an alternating signal for energization, are employed. The structure of the display device can comprise a sandwish including a rear electrode segmented to define a plurality of element areas each equal to the smallest increment that a display pattern can be moved and a front transparent electrode, segmented to define a plurality of areas each equal to the total area of several element areas. An illuminable material such as phosphor is sandwiched between the front and read electrodes. Each display or illuminable element is defined by an element area and the portions of the front electrode and center material overlaying it.

In accordance with a significant feature of the present invention, it is recognized that each illuminable element can be efficiently connected so that its energization depends upon the closure of all of a plurality of switches and that if any one of the switches is open, the element will not be energized. For example, consider that the front and rear electrodes of a single element are connected to opposite sides of an alternating signal source, each electrode being connected through a different circuit comprised of oppositely poled, parallel connected diodes. Also, assume that a different switch is connected in series with each diode. The alternating signal to energize the element will of course be provided thereto only if all four of the switches are closed. In accordance with a significant aspect of the present invention, these diodes coupling the alternating signal source to the illuminable element are efficiently arranged in front and rear diode matrices which enables display patterns to appear to move in element increments with relatively simple and inexpensive electronic control apparatus. Assuming, for example, that $M_1N_1$ rear electrode areas are defined, each can be controlled by a matrix to which are coupled $M_1+N_1$ switches. Similarly, $M_2N_2$ front electrode areas can be controlled by a matrix including $M_2+N_2$ switches. Of course, a display element will be illuminated only if both its front and rear electrodes are connected to the alternating signal source. Thus, $M_1N_1M_2N_2$ elements could actually be controlled by $M_1+N_1+M_2+N_2$ switches.

In the preferred embodiment of the invention however, the rear electrode can be considered as being comprised of element areas segregated into groups, each group being identically connected through a single diode encoding matrix to one side of the alternating signal source. Each area on the front electrode overlays at least two areas on the rear electrode and is differently connected through an encoding matrix to the second side of the alternating signal source. The only elements that will be illuminated of course will be those elements disposed between areas on the front and rear electrode which are connected to the alternating signal source. Since it is desirable that the display pattern be able to appear to move smoothly through the display elements, at least two front electrode areas overlay each group of element areas. In this manner, a display pattern can move smoothly from one group to the next.

In accordance with a still further aspect of the present invention, several different series of contiguous elements can be mounted and operated together to enable patterns, such as decimal digits or other more arbitrary patterns, to be displayed.

The novel features that are considered characteristic of this invention are set forth with particularity in the appended claims. The invention itself will best be understood from the following description when read in connection with the accompanying drawings, in which:

FIGURE 1 is a schematic representation illustrating the apparent physical movement of a particular display pattern, i.e. a reference pointer in accordance with the present invention;

FIGURE 2 is a schematic electrical diagram illustrating the manner in which a single display element can be connected in accordance with the present invention;

FIGURE 3 is a plan view illustrating front and read electrodes and illuminable material which can be sandwiched therebetween in accordance with the present invention;

FIGURE 4 is a schematic block diagram illustrating an embodiment of the present invention for displaying and moving the pattern of FIGURE 1;

FIGURE 6 is a schematic diagram illustrating the apparent movement of a slightly more complex display pattern;

FIGURE 7 illustrates the manner in which the display pattern of FIGURE 6 can be used in conjunction with other display patterns to form a decimal digit;

FIGURE 9 illustrates the implementation of a rear electrode display element group and encoding matrix therefor capable of defining any decimal digit and rolling that digit through a group of display elements;

Figure 10:
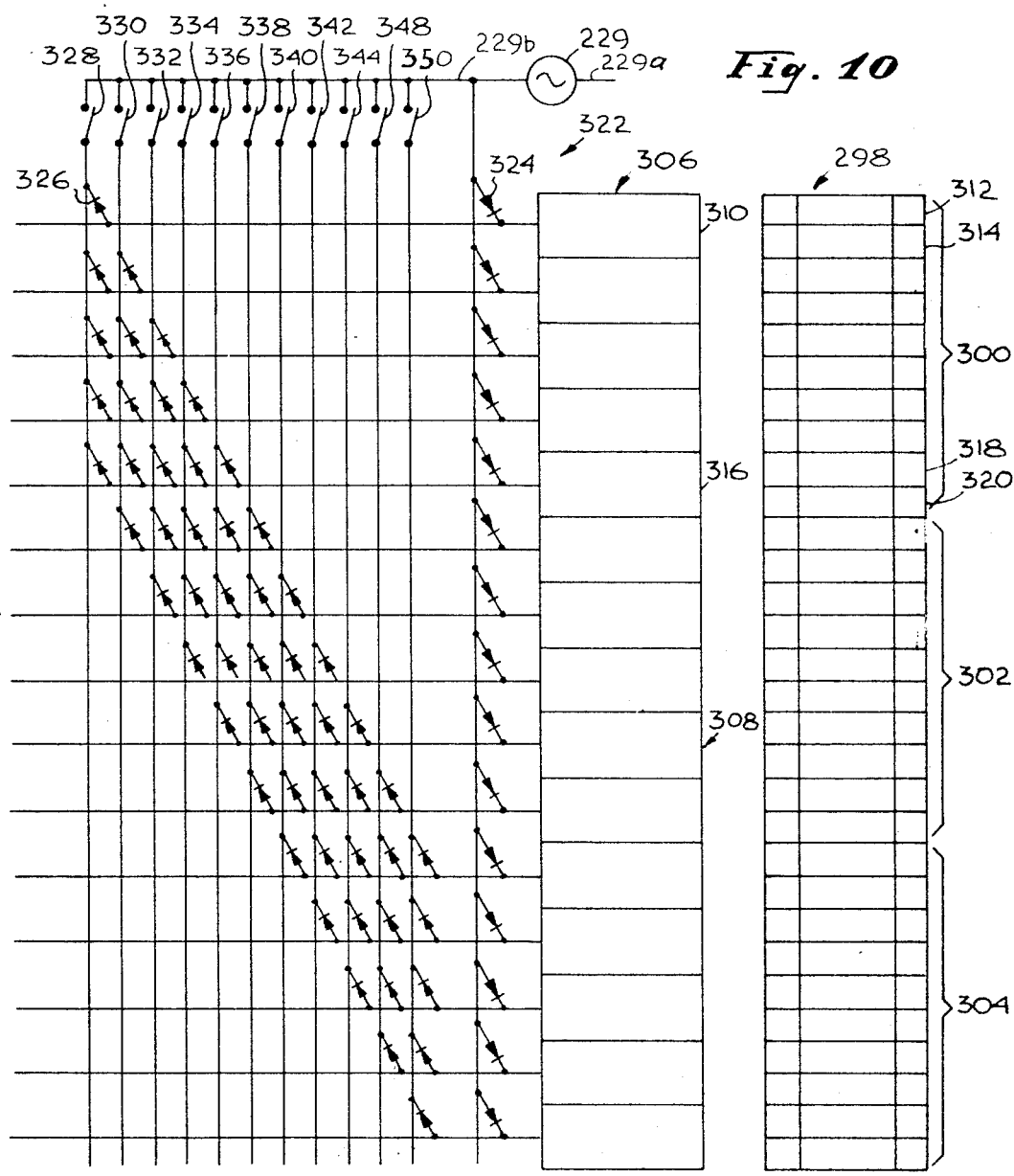
FIGURE 10 illustrates the implementation of a front electrode and encoding matrix therefor for use with the rear electrode of FIGURE 9.

FIGURE 11 diagrammatically illustrates the manner in which the front and read electrodes of FIGURES 9 and 10 are controlled to create a moving tape effect; and FIGURE 12 diagrammatically illustrates a further embodiment of the invention for creating a moving tape effect.

Attention is now called to FIGURE 1 of the drawings which in FIGURE 1a schematically illustrates a display device 10 positioned adjacent a fixed scale 12. The display device 10 is capable of visually displaying a pattern 14 which is intended to represent a reference pointer which can be electronically moved relative to the fixed scale 12. More particularly, note in the successive FIGURES 1b through 1f that the pattern 14 is moved downwardly in small increments. In accordance with the present invention, the pattern 14 can be moved in increments having a dimension smaller than the smallest dimension of the display pattern 14. For example only, the display pattern 14 as shown in FIGURE 1c can have a height of .050 inch and it can be moved relative to the fixed scale 12 in increments of .025 inch. It should be appreciated that these numbers are exemplary in nature only and that the ratio between an increment of movement and the height of the display pattern can be very much greater. For example, in the preferred embodiment of the invention illustrated in FIGURES 7–10, the display pattern has a height equal to eight times an increment of movement. Thus a display pattern constituting approximatley a quarter-inch decimal digit can be moved in increments of .030 inch. However, an increment of movement can be reduced even considerably further if desired to .005 inch or less.

FIGURE 1g illustrates the pattern 14 approaching the lower limit of the scale 12 while FIGURE 1h illustrates the pattern at the lower limit of the scale and FIGURE 1i illustrates the pattern 14 partially off scale. As will be understood better hereinafter, the embodiments of the invention contemplate recirculating the pattern 14 if desired so that the bottom half of the pattern 14 off scale in FIGURE 1i could reappear at the top of the scale. Although FIGURE 1 illustrates the display pattern in the form of a straight horizontal bar, more complex and arbitrary patterns are contemplated. For example, as will be seen hereinafter, any selected decimal digit can be created and moved in accordance with the teachings of the present invention. It should also be appreciated that in addition to creating reference pointers and digits, the teachings of the present invention can also be employed to visually present bar graphs or other more complex patterns.

Attention is now called to FIGURES 2 and 3 of the drawings which illustrate a preferred display apparatus structure in accordance with the present invention and the manner in which a single element 18 of that structure can be connected to an alternating signal source. More particularly, the display structure can be comprised of a sandwich including a front transparent electrode 20 formed of conductive glass, a rear opaque silver coated electrode 22, and a piece of illuminable material such as phosphors in a dielectric medium 24 therebetween. Both the front electrode 20 and the rear electrode 22 are scribed as at 26 to thereby define electrically isolated electrode areas. More particularly, the rear electrode 22 defines a plurality of element areas 28. The front electrode 20 defines a plurality of areas which will henceforth be referred to as subsectional areas 30. Each subsectional area is selected to overlay a plurality of element areas 28. As will be understood better hereinafter, the element areas 28 are electrically segregated into element groups with two or more subsectional areas 30 overlaying the elements of a group.

Display elements 18, such as the electroluminescent element illustrated in FIGURES 2 and 3, can be energized and illuminated by the application of an alternating signal across the electrodes 20 and 22 thereof. Such a signal can be provided by the source 32 illustrated in FIGURE 2. In order to permit a plurality of display elements 18 to be efficiently controlled, in accordance with the present invention, the front electrode 20 can be connected to a first terminal of the source 32 through parallel circuit branches 34 and 36. The branches 34 and 36 are respectively comprised of oppositely poled unidirectional current conducting elements 38 and 40. Although these elements have been illustrated as comprising conventional diodes, they need not in fact comprise diodes but can be less expensive elements possessing a somewhat similar nonlinear impedance characteristic. Switching devices 42 and 44 are respectively connected in series with the unidirectional current conducting devices 38 and 40. The switching devices 42 and 44 can take several physical forms including mechanical, electromechanical, and solid-state devices.

The rear electrode 22 of the display element 18 is connected to the second terminal of the source 32 through parallel circuit branches 46 and 48 containing oppositely poled unidirectional current conducting elements 50 and 52. Switches 54 and 56 are respectively connected in series with the devices 50 and 52.

Inasmuch as the display element 18 requires the application of an alternating signal in order for it to be illuminated, it is necessary that all four switches, i.e. 42, 44, 54, and 56, be closed to energize the display element 18. If any one of these switches is open, an alternating signal will not of course be applied to the display element 18 and consequently, the element will not be illuminated. Essentially, in accordance with the present invention, the circuit of FIGURE 2 is used as the basis for forming matrix arrangements for selectively efficiently illuminating display elements in a row of contiguous identical elements, for causing a display pattern to appear to physically more along the row.

Although a particular type of display structure has been illustrated in FIGURES 2 and 3, it is to be understood that other display structures energizable by an alternating signal can be utilized.

Attention is now called to FIGURE 4 which illustrates a schematic block diagram of an exemplary embodiment of the present invention. The display apparatus of FIGURE 4 can be considered as being comprised of a display structure generally identified by numeral 60 and electronic control apparatus for energizing the display structure to represent and move a display pattern in accordance with information provided by a source 62. The source 62 can comprise any device providing either digital or analog signals representing a pattern to be displayed and the position of that pattern relative to some reference position. The information provided by the source 62 is coupled to conversion apparatus 64 and 66 which respectively operate switching circuits 68 and 70. The particular nature of the signals provided by the information source 62 and the nature of the conversion performed by the apparatus 64 and 66 will not be discussed herein except to say that the conversion apparatus can be similar to that disclosed in the aforecited patent application for converting analog input information into switch control signals. It is only necessary that the conversion apparatus 64 and 66 operate the switching circuits 68 and 70 to properly position the pattern to be displayed. The switching circuits 68 and 70 respectively control encoding matrices 72 and 74.

The display structure 60 is comprised of a rear electrode 76, a front electrode 78 and an illuminable material 80 therebetween. The rear electrode 76 is segmented into a plurality of element areas 82. In the exemplary embodiment of FIGURE 4, the rear electrode 76 is comprised of 48 element areas 82 which are physically contiguous with one another but are electrically isolated from one another. The front electrode 78 is segmented into twenty-four subsectional areas 84 which are likewise physically contiguous with one another but electrically isolated from one another. Each subsectional area 84 overlays at least two element areas 82. A "display element" is considered to be any one of the element areas 82 together with those portions of the front electrode 78 and center material 80 overlaying that element area. A "display pattern" is considered to be any set of element areas which are illuminated together. In the exemplary embodiment of FIGURE 4, a display pattern comprised of two adjacent element areas will be assumed.

The element areas of the rear electrode 76 can be considered as being segregated into element groups, each group being comprised of eight element areas. Thus, four subsectional areas 84 overlay each element group. Each subsectional area 84 can be considered as part of a section, each section including eight subsectional areas. Thus, the front electrode 78 can be considered as being comprised of three sections.

In accordance with the present invention, in order to control the display structure 60 such that a display pattern can appear to be moved in increments equal to element areas to thus permit each pattern to be moved through the eight ($M_1N_1$) positions of an element area group, the rear encoding matrix 74 is provided with six ($M_1=4$, $N_1=2$) input lines and eight output lines. The front electrode matrix 72 controls twenty-four ($M_2N_2$) areas and is provided with eleven ($M_2=8$, $N_2=3$) input lines and twenty-four output lines. The numbers of lines designated in FIGURE 4 are offered not for the purpose of limiting the invention but rather for the purpose of facilitating an explanation of the operation of an embodiment of the invention and for indicating the relatively few connections required between the alternating signal source 86 and the matrices 72 and 74 and between the matrices 72 and 74 and the display structure 80 in order to position the pattern in any one of forty-eight positions.

Figure 5:
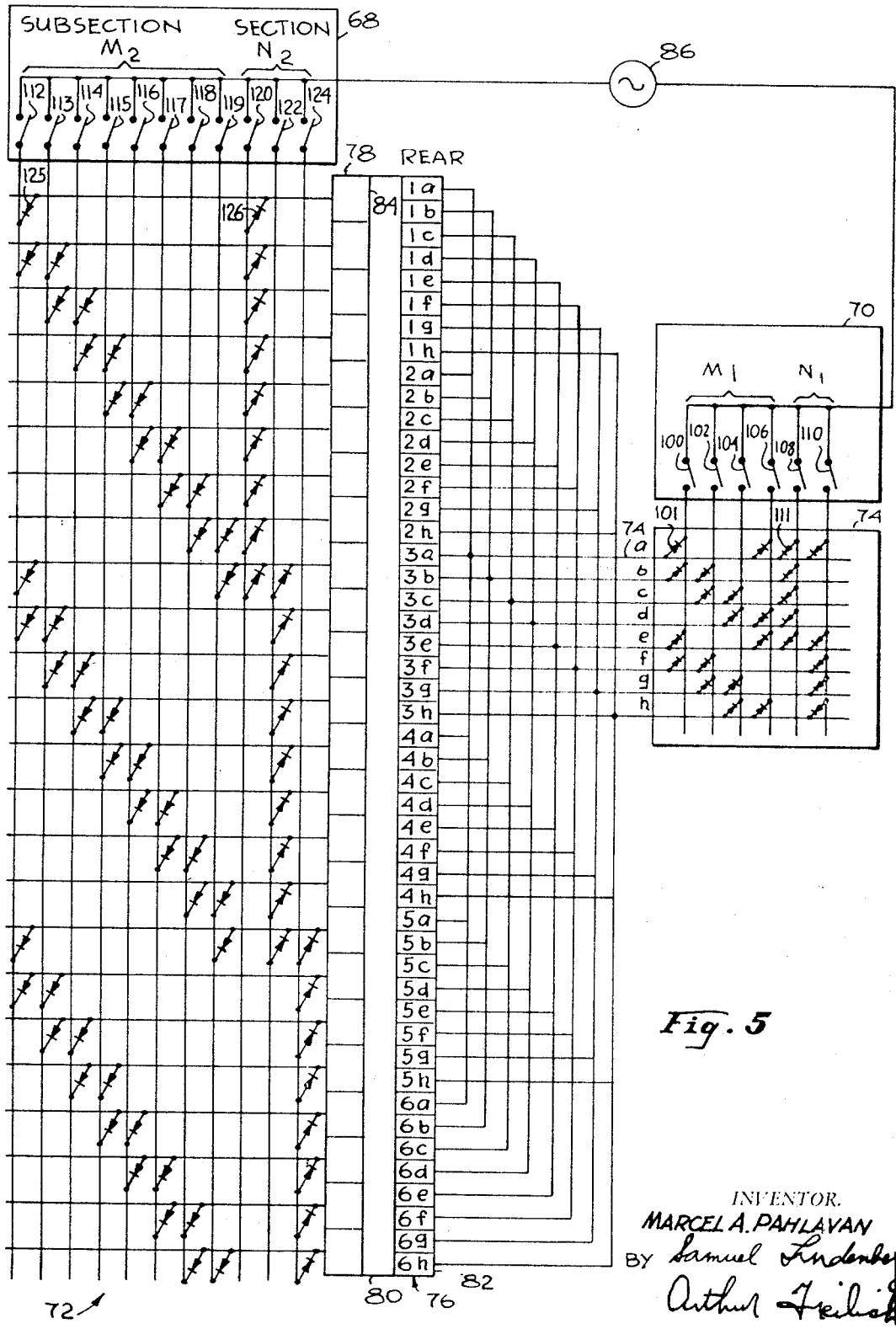
FIGURE 5 is a schematic diagram illustrating the details of the encoding matrices employed in FIGURE 4.

Attention is now called to FIGURE 5 which illustrates the details of the front and rear electrode encoding matrices 72 and 74. As has been mentioned in conjunction with FIGURE 4, the rear electrode 76 is segmented into element areas 82 which form element groups, each group containing eight element areas. For purposes of reference, each element area will be referred to by a number to designate its element group and a letter to designate its position in that group. Thus, element area 4a comprises the first element area in element group 4. The areas of the front electrode 78 will be referred to by the element areas they overlay.

It will be noted in FIGURE 5 that the first terminal of alternating signal source 86 is connected through six ($M_1+N_1$) lines of switching circuit 70 to the encoding matrix 74. Similarly, it can be noted that the second terminal of the alternating signal source 86 is connected through eleven ($M_2+N_2$) lines of switching circuit 68 to the front electrode encoding matrix 72.

The rear electrode encoding matrix 74 has eight output lines 74a–74h which are respectively connected to corresponding element areas of each of the element groups. Thus output line 74a of encoding matrix 74 is connected to element area a of each of groups 1 through 6. The function of the switching circuit 70 and encoding matrix 74 is to define the display pattern and position of the display pattern within each of the element groups. Thus, note that switch 100 is connected through upwardly directed diodes 101 to each of element areas a, b, e, and f in every element group. As will become apparent, when switch 100 is closed, element areas a, b, e, and f of each of the element groups can be illuminated. The particular element areas which are illuminated depend upon the switching circuit 68 and encoding matrix 72 in addition to switches 108 and 110 of the switching circuit 70.

Switch 102 is connected through diodes to element areas b, c, f, and g of all of the element groups. Switch circuit 104 is connected through diodes to element areas c, d, g, and h of all of the groups. Switch 106 is connected to element areas a, d, e, and h of all of the element groups.

Switch 108 is connected to element areas a–e of all the element groups through downwardly directed diodes 111 which are poled opposite to the diodes 101 connecting the element areas to the switches 100, 102, 104, and 106. Switch 110 is connected to element areas a and e–h through diodes 111.

In the operation of the rear electrode encoding matrix 74, one of switches 100, 102, 104, and 106 is closed and one of switches 108 and 110 is closed. Consider for example that switch 102 is closed and switch 110 is closed. As a consequence, element areas f and g of all of the element groups will be connected to the first terminal of the alternating signal source 86 through oppositely poled diodes 101 and 111. The particular element areas f and g which will actually be illuminated will depend upon which switches in switching circuit 68 are closed.

Switching circuit 68 is comprised of eight switches 112–119 which respectively determine the subsectional areas 84 in each section to be connected to the second terminal of the alternating signal source 86. Switches 120, 122, and 124 determine which section is to be connected to the source 86.

More particularly, switch 112 is connected through downwardly directed diodes 125 to subsectional areas 1a,b, 1c,d, 3a,b, 3c,d, 5a,b, 5c,d. Switch 113 is similarly connected through downwardly directed diodes 125 to subsectional areas 1c,d, 1e,f, 3c,d, 3e,f, 5c,d, and 5e,f. Switches 114–119 are each similarly connected through downwardly directed diodes 125 to three pairs of adjacent subsectional areas. Switch 120 on the other hand is connected through upwardly directed diodes 126 to subsectional areas 1a,b through 3c,d. Switch 122 is connected through upwardly directed diodes 126 to subsectional areas 3a,b through 5a,b. Switch 124 is similarly connected through upwardly directed diodes to subsectional areas 5a,b through 6g,h.

In the operation of the embodiments of FIGURES 4 and 5, information source 62 will provide signals to the conversion apparatus 64 and 66 which will be converted to signals for controlling the switching circuits 68 and 70 to position the display pattern. More particularly, let it be assumed that the display pattern is to be positioned coincident with element areas 2h and 3a. In order to do this, it would be necessary to close switch 106 thereby connecting each of the element areas a and h through an upwardly directed diode 101 to the alternating signal source 86. In order to eliminate element areas d and e, switch 110 should also be closed to thereby also connect element areas a and h through downwardly directed diodes 111 to the alternating signal source 86. Thus, the switching circuit 70 and encoding matrix 74 determine which two out of the eight element areas in each of the element groups can be energized. The switching circuit 68 and front electrode encoding matrix 72 selects the specific element areas to be energized. Thus, if element areas 2h and 3a are to be energized, switch 120 would be closed to thereby couple subsectional areas 2g,h and 3a,b to the alternating signal source through the upwardly directed diodes 126. In addition, it is necessary to close switch 119 in order to connect subsectional areas 2g,h and 3a,b to the signal source 86 through the downwardly directed diodes 125.

Attention is now called to FIGURES 6a–f which illustrate a slightly more complex display pattern being apparently moved vertically. More particularly, in FIGURE 6, the display pattern 148 is comprised of eight contiguous element areas. Four distinct element groups 150, 152, 154, and 156 are provided. FIGURE 6a illustrates the display pattern 148 illuminated in the uppermost position in the element group 150. As previously noted, the pattern and its position in an element group is defined by the switches connected to the rear electrode encoding matrix. Since each element group is connected in the same manner to the rear electrode encoding matrix, identically positioned element areas in each group will be connected to the alternating signal source. These element areas in groups 152, 154, and 156 are represented by dotted lines. The front electrode encoding matrix and associated switches determine which groups are to actually be illuminated. Thus, FIGURE 6a for example, assumes that the front electrode is selecting element group 150.

FIGURE 6b illustrates the pattern 148 after it has moved down by one increment of movement, i.e. an element area. FIGURE 6c illustrates the pattern 148 after it has moved down still another increment. FIGURE 6d illustrates the pattern 150 after the lower portion thereof has run off the bottom of each element group and has recirculated. By properly controlling the front electrode, the pattern can be displayed in the lower seven element areas of group 150 and the upper element area of group 152 as shown in FIGURE 6d. FIGURE 6e illustrates the display pattern 148 moved to the lowermost position in element group 156 and FIGURE 6f illustrates the pattern 158 running off the bottom of element group 156 and returning at the top element of group 150. From a consideration of the foregoing, it should now be apparent that the display of FIGURE 6 can be generated by providing both a rear electrode encoding matrix capable of recirculating the eight element area display pattern through each of a plurality of element groups and a front electrode encoding matrix for selecting the specific element areas to be illuminated.

Attention is now called to FIGURE 7 which illustrates how the display apparatus of FIGURE 6 can be utilized in conjunction with similar display apparatus to display the decimal digit "8." More particularly, note that the display apparatus of FIGURE 7 can be considered as being comprised of first and second display strips 200 and 202 each identical to the display strips shown in FIGURE 6. Thus, each can be comprised of forty element areas separated into four element groups, each group containing ten areas. An additional display portion 204 is situated between the display portions 200 and 202. Whereas the patterns to be displayed by the strips 200 and 202 are comprised of eight contiguous relatively narrow element areas, the pattern to be displayed by the center strip 204 is comprised of three spaced element areas 206, 208, and 210 each having a vertical dimension equal to one element area. In addition to the display strips 200, 202, and 204, a display strip 212 can be provided which is also comprised of forty element areas arranged in four groups of ten areas per group. Preferably, the pattern to be displayed by the strip 212 is comprised of a single element area 214 aligned with the area 208 of strip 204. Whereas the digit "8" is displayed in only one of the element groups at a time, the bar 214 is simultaneously displayed in each element group.

Figure 8E:
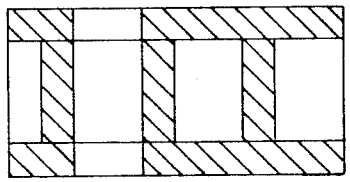
FIGURE 8 illustrates the manner in which a decimal digit can be rolled through a group of display elements.
Figure 8D:
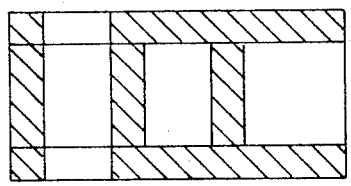
Figure 8C:
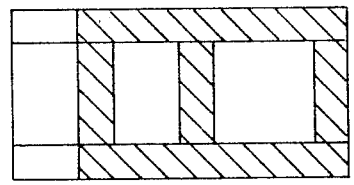
Figure 8B:
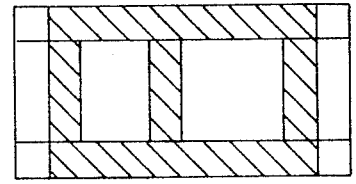
Figure 8A:
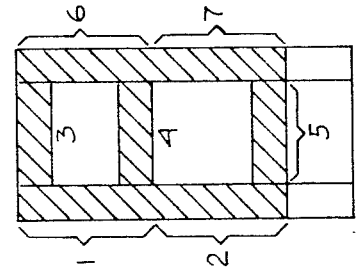
Figure 8J:
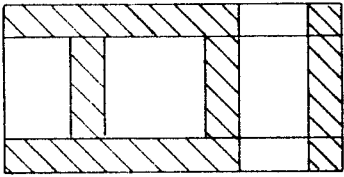
Figure 8I:
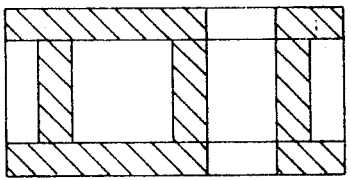
Figure 8H:
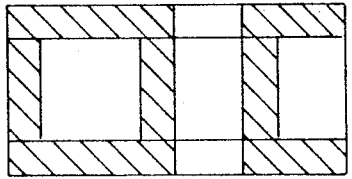
Figure 8G:
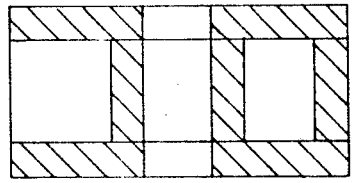
Figure 8F:
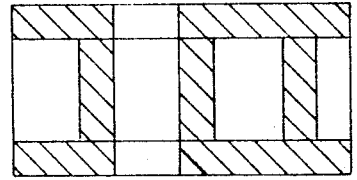

By providing the encoding matrix of FIGURE 9, the digit "8" as shown in FIGURE 7 can be apparently moved through all four of the element groups in the same manner that the display pattern in FIGURE 6 was moved through four element groups. FIGURE 8a illustrates an initial position of the digit "8" while FIGURES 8b–j respectively illustrate the other nine positions which can be assumed by the digit "8" in the course of being recirculated through the ten element area group.

FIGURE 9 illustrates a rear electrode encoding matrix capable of recirculating the digit "8" through each of the ten positions illustrated in FIGURE 8. Prior to considering the specifics of FIGURE 9 however, it is pointed out that the digit "8" can be considered as being comprised of seven segments, as illustrated in FIGURE 8a which can be selectively deenergized to define each of the other decimal digits. The blanking of selected segments in a digit "8" to form other decimal digits is well known in the art and is discussed in the aforecited patent application. The following table summarizes which segments should be kept on and which should be kept off to define each of the ten decimal digits.

TABLE

| Digit | Numeric segments | |
|---|---|---|
| | On | Off |
| 1 | 6, 7 | 1, 2, 3, 4, 5 |
| 2 | 2, 3, 4, 5, 6 | 1, 7 |
| 3 | 3, 4, 5, 6, 7 | 1, 2 |
| 4 | 1, 4, 6, 7 | 2, 3, 5 |
| 5 | 1, 3, 4, 5, 7 | 2, 6 |
| 6 | 1, 2, 3, 4, 5, 7 | 6 |
| 7 | 3, 6, 7 | 1, 2, 4, 5 |
| 8 | 1, 2, 3, 4, 5, 6, 7 | |
| 9 | 1, 3, 4, 5, 6, 7 | 2 |
| 0 | 1, 2, 3, 5, 6, 7 | 4 |

Attention is now called to FIGURE 9 which illustrates an element group 220 of a rear electrode structure. The element group includes display strips 200, 202, and 204 mentioned previously in conjunction with FIGURE 7. Actually, the element areas forming the strips 200, 202, and 204 can all be scribed on a single rear electrode structure. Thus, ten narrow element areas 222 are defined down one side of the rear electrode structure and ten similar narrow element areas 224 down the other side. Ten relatively wide element areas 226 are defined between the areas 222 and 224.

FIGURE 9 illustrates a rear electrode encoding matrix for recirculating any decimal digit. By using it in conjunction with the front electrode and matrix of FIGURE 10, a moving tape effect can be created.

In the embodiment of FIGURE 9, the first terminal 229a of the alternating signal source 229 is connected through upwardly directed diodes 230 to each of the thirty element areas (i.e. ten areas 222, ten areas 224, ten areas 226) on the rear electrode group 220. The oppositely poled diodes connecting each of the element areas to the first terminal of the source 229 are arranged in seven matrices, each corresponding to a different one of the segments forming the pattern "8" as shown in FIGURE 8a. That is matrix 231 controls display segment one and matrices 232–237 respectively control display segments 2–7. Each of the seven segment matrices is provided with ten lines which are connected through resistors 238 to the ten switches of switch bank 239 coupled to the first terminal of the source 229. The seven matrices enable a pattern "8" to be recirculated through the ten positions as illustrated in FIGURE 8, by sequentially closing the ten switches of switch bank 239. In order to define decimal digits other than "8," selected segments are blanked out, in accordance with the aforeset forth Table I, by a number generating diode matrix 240 which is able to disable any of the segment matrices to thereby prevent illumination of the corresponding display segment regardless of which of the ten possible display positions is being defined.

More particularly, initially consider the control of display segment six by matrix 236. It can be noted that when switch 1 of switch bank 239 is closed, the alternating signal source 229 will be connected through diodes 244, 246, 248, and 250 to the top four element areas in strip 222. On the other hand, when switch 2 of switch bank 239 is closed, the top element area of strip 222 will not be connected to the source 229 but the next four element areas will be. Thus, it should be appreciated that by closing switch 1, segment 6 of the pattern "8" will initially be in its uppermost position and then by opening switch 1 and closing switch 2, the segment 6 will be moved down by one element area. In a similar fashion, segment 6 can be moved through each of the ten different positions required to recirculate the pattern "8" through the element group as shown in FIGURE 8.

Each of the other display segments (i.e. segments 1–5 and 7) is connected to the rear electrode group 220 in a similar manner. Taking one further example, consider matrix 233 which controls the movement of segment 3 of the pattern "8." When switch 1 of switches 239 is closed, diode 254 will connect the first terminal of source 229 to the uppermost element area of strip 226. As succeeding ones of the switches 239 are closed, the segment 3 matrix 233 will successively cause lower element areas in the strip 226 to be energized.

Thus, it should be appreciated that the seven segment matrices can indeed recirculate a pattern "8" through the element group 220 in the manner shown in FIGURE 8.

In order to generate specific decimal digits, certain ones of the segments have to be blanked out in accordance with the aforeset forth Table I. The matrix 240 is used for this purpose and includes ten switches 261 through 270, each corresponding to a different one of the decimal digits to be formed. The switches are connected to a direct current source 273. In order to create the digit one for example, it is necessary to blank segments 1, 2, 3, 4, and 5. Accordingly, switch 261 is coupled through diodes 272 to segment matrices 231, 232, 233, 234 and 235. Accordingly, when switch 261 is closed, the source 273 will provide a direct current potential to the anode of the isolating diodes 276 of each of these matrices thereby driving the upper terminals of the resistors 238 thereof to a positive potential sufficient to backbias the downwardly directed diodes in the segment matrices. Thus, closure of switch 261 only permits the matrices 236 and 237, associated with segments 6 and 7, to illuminate the element areas connected thereto. Taking another example, when switch 270 is closed, segment 4 is blanked inasmuch as the direct current source 273 will be connected through diode 280 to isolating diodes 282 connected to matrix 234. As a consequence, the upper terminal of all of the resistors 238 connected to the lines of matrix 234 will be driven to a positive potential sufficient to backbias the matrix diodes.

From the foregoing explanation of FIGURE 9, it should be appreciated that any decimal digit can be displayed and recirculated within the element group. It should also be apparent that recirculation occurs in incremental steps which have a dimension equal to one-eighth the height of the digit being displayed. Thus, if approximately quarter-inch digits are to be displayed, the digit can appear to be moved in increments of .030 inch.

Attention is now called to FIGURE 10 which illustrates a rear electrode structure 298 comprised of three element groups 300, 302, and 304, each of which can be identical to the group 220 illustrated in FIGURE 9. Moreover, each of the rear electrode groups 300, 302 and 304 is identically connected to the rear electrode encoding matrix shown in FIGURE 9.

A front electrode assembly 306 is provided which is comprised of subsectional areas 308, each overlaying two element areas of the rear electrode structure 298. Thus, area 310 of the front electrode structure 306 overlays areas 312 and 314 of the rear electrode structure. Area 316 of the front electrode structure 306 overlays areas 318 and 320 of the rear electrode structure.

In order to display a decimal digit and move it in the manner shown in FIGURE 7, a front electrode encoding matrix 322 is provided to enable five adjacent areas 308 of the front electrode structure 306 at any one time. The encoding matrix 322 includes a set of diodes 324, poled as illustrated, connecting each of the areas 308 to the second terminal 229b of the alternating signal source 229. In addition, each of the areas 308 is also connected to the terminal 229b through oppositely poled diodes 326. More particularly, switch 328 connects the uppermost five areas of the front electrode structure 306 through diodes 326 to terminal 229b. Switch 330 skips the uppermost area of the front electrode structure 306 and connects the subsequent five areas through diode 326 to the terminal 229b. In similar fashion, each of switches 322–350 connects five different areas of the front electrode structure 306 to terminal 229b. Therefore, at any time, five adjacent areas of the front electrode structure 306 will be connected through a pair of oppositely poled diodes 324 and 326 to the terminal 229b through one of the switches 328–350. The five areas that are so selected define the position of the pattern being generated by the encoding matrix of FIGURE 9 coupled to the rear electrode structure of FIGURE 10. Accordingly, the apparatus of FIGURES 9 and 10 can be utilized to move a decimal digit in the manner shown in FIGURE 7.

Figures 11A, 11B, 11C, 11D, 11E, 11F, 11G:
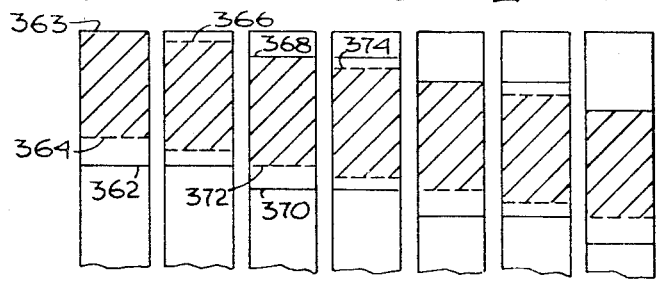

FIGURE 11 diagrammatically illustrates this movement. More particularly, in FIGURE 11a the solid lines 360 and 362 represent the five front electrode areas 308 which are coupled to the source 229 through oppositely poled diodes. The dotted line 364 illustrates the bottom boundary of the eight element area display pattern being generated by the rear electrode encoding matrix. In FIGURE 11b, it should be apparent that the same front electrode areas are connected to the source 229 as in FIGURE 11a. However, it should also be apparent that the pattern defined by the rear electrode encoding matrix has moved down one element area with the dotted line 336 now defining the upper boundary of the display pattern. FIGURE 11c indicates that the second switch, i.e., switch 30 of the front electrode encoding matrix 322, has been closed to thereby connect the second through sixth uppermost areas of the front electrode structure 306 to the source 229. That is the front electrode areas between the solid lines 368 and 370 are connected to the source 229. The dotted line 372 indicates the lower boundary of the display pattern generated by the rear electrode apparatus. FIGURE 11d illustrates the pattern generated by the rear electrode apparatus having moved down by one element area with its upper boundary being defined by the dotted line 374. FIGURES 11e–g illustrate the display pattern in successively lower positions.

Attention is now called to FIGURE 12 which illustrates the front and rear electrode structures of a still more sophisticated embodiment of the present invention together with an illustration of a resulting display. More particularly, FIGURE 12a illustrates a front electrode structure 400 comprised of a plurality of areas 402. The front electrode structure 400 overlays the rear electrode structure 406 shown in FIGURE 12b. The rear electrode structure 406 differs from the rear electrode structure 298 illustrated in FIGURE 10 in that all of its areas are of equal size. That is the rear electrode structure 406 is segmented into square areas. By interconnecting three adjacent areas 408, 410 and 412, a wider central display strip, like display strip 226 of FIGURE 9, can be formed. The advantage of utilizing a symmetrically segmented rear electrode structure as shown in FIGURE 12b is of course that the patterns or digits displayed can be positioned and moved to any locations desired depending upon the complexity of the encoding matrices employed. Economic and application considerations of course would determine the degree of complexity of the encoding matrices.

FIGURE 12c illustrates a typical display which can be presented by the front and rear electrode structures 400 and 406 using encoding matrices of the type discussed in conjunction with FIGURES 9 and 10. It should be apparent that the display of FIGURE 12c comprises a scale or tape which can be moved by proper operation of the encoding matrices. As can be noted in FIGURE 12c, the graduation markers appear to the left of the digits. The significance of the symmetrical segmentation of the rear electrode structure 406 of FIGURE 12b can be appreciated by pointing out that the graduation markers can be moved to the right of the numbers and the numbers can be moved to the left by changing the electrical connections from the encoding matrices to the rear electrode structure. Thus, identical front and rear electrode display structures can be employed to form different display devices.

Because the physical characteristics of electroluminescent materials have been widely discussed in the literature, very little mention has been made of them herein. Such discussions in the literature recognize that the color provided by an illuminated electroluminescent element is dependent upon the luminescent material employed. That is by employing different materials, even assuming the same energizing signal, different colors can be achieved. In view of this, in order to render the display devices presented herein more effective, where economic considerations warrant it, the color of the luminescent material sandwiched between the front and rear electrodes can gradually change from one color at the top, e.g., green, to another color at the bottom, e.g., red. This feature can be exceedingly useful in the display of pointers or bar graphs inasmuch as the pointer entering the red region can act as an extra warning to an observer that a certain quantity has exceeded a limit, for example.

From the foregoing, it should be appreciated that an apparatus has been disclosed herein suitable for electronically simulating physical movement of a displayed pattern. Although the display structure shown in the preferred embodiments of the invention herein comprise solid-state electroluminescent elements, it is recognized that other devices which, for example, can employ an ionizable gas, can be used. It is also pointed out that other variations and modifications will occur to those skilled in the art which fall within the spirit of the invention and are encompassed by the appended claims. For example, it is again pointed out that although conventional diodes have been illustrated in the drawings, other elements exhibiting nonlinear impedance characteristics may perform equally as well and be considerably less expensive. Likewise, the conventional resistors 234 shown in FIGURE 9 can be eliminated and other suitable impedance means can be substituted therefor. Most significantly of course, it is pointed out that the teachings of the present invention can be employed to create an infinite number of different display arrangements employing different numbers of element groups, elements in each group, etc. No attempt has been made herein to exhaust the multitude of different configurations possible in accordance with the invention. Rather, preferred and exemplary embodiments of the invention have been presented for the purpose of teaching the basic concepts of the invention to those skilled in the art.

What is claimed is:

1. A moving tape type display apparatus comprising:
a display structure comprised of a first plurality of display elements formed by spaced first and second electrode structures, said first electrode structure being segmented to define a first plurality of contiguous identical element areas extending in a first direction, said second electrode structure being segmented to define a plurality of contiguous identical areas each opposed to different areas of said first plurality of element areas;
information source means providing pattern and position information;
a source of alternating signals having first and second terminals;
a first encoding matrix responsive to said pattern and position information for identically coupling different groups of said first plurality of element areas to said first source terminal;
a second encoding matrix responsive to said pattern and position information for differently coupling each of said second electrode areas to said second source terminal to thus create an illuminated display pattern having a certain dimension along said first direction;
said information source means including means for modifying said position information to cause the apparent physical movement of said display pattern along said first direction by an incremental distance less than said certain dimension.

2. The apparatus of claim 1 wherein said first encoding matrix includes $M_1+N_1$ switches and is connected identically to different groups of said first plurality of element areas, each group containing $M_1 \cdot N_1$ element areas.

3. The apparatus of claim 2 wherein said second encoding matrix includes $M_2+N_2$ switches and is connected to uniquely control each of $M_2 \cdot N_2$ second electrode areas and wherein each of said second electrode areas overlays at least two of said first electrode element areas.

4. The apparatus of claim 2 wherein said $M_1$ and $N_1$ switches are connected to said first electrode element areas through diodes respectively poled in opposite directions.

5. The apparatus of claim 2 wherein said first encoding matrix includes means for simultaneously connecting a corresponding plurality of first electrode element areas in each of said groups to said first terminal.

6. The apparatus of claim 1 wherein said first electrode structure includes a plurality of element areas extending in a second direction perpendicular to said first direction.

7. The apparatus of claim 6 including means for blanking selected portions of said display pattern.

8. An apparatus for displaying elected pattern and for causing the apparent physical movement of said patterns, said apparatus comprising:
a plurality of contiguous identical solid state display elements, each having first and second electrodes, arranged in a row extending in a first direction, each of said display elements normally defining an unenergized state and being responsive to the application of an alternating signal thereto for switching to an illuminated state;
an alternating signal source having first and second terminals;
first and second encoding means for selectively coupling said alternating signal source to at least two of said display elements to thus define a display pattern having a certain dimension extending in said first direction; and
means for shifting the state of each of said elements to an adjacent element in said row to thus cause the apparent physical movement of said pattern in said first direction in increments smaller than said certain dimension;
said first and second encoding means including first and second oppositely poled unidirectional current conducting devices connected in parallel circuit branches between each of said first electrodes and said first terminal;
third and fourth oppositely poled unidirectional current conducting devices connected in parallel circuit branches between each of said second electrodes and said second terminal; and
a different switch means connected in series with each of said unidirectional current conducting devices.

9. An apparatus for displaying selected patterns and for causing the apparent physical movement of said patterns, said apparatus comprising:
a plurality of contiguous identical solid state display elements defined by spaced first and second electrode structures and arranged in a row extending in a first direction, each of said display elements normally defining an unenergized state and being responsive to the application of an alternating signal thereto for switching to an illuminated state;
an alternating signal source having first and second terminals;
first and second encoding means for selectively coupling said alternating signal source to at least two of said display elements to thus define a display pattern having a certain dimension extending in said first direction; and
means for shifting the state of each of said elements to an adjacent element in said row to thus cause the apparent physical movement of said pattern in said first direction in increments smaller than said certain dimension;
said first electrode structure being segmented to define a plurality of contiguous identical element areas extending in said first direction;
said second electrode structure being segmented to define a plurality of contiguous identical areas each opposed to different ones of first electrode element areas extending in said first direction;
said first encoding means identically connecting different groups of said first electrode element areas to said first source terminals; and
said second encoding means differently connecting each of said second electrode areas to said second source terminal.

10. The apparatus of claim 9 wherein said first electrode structure also includes a plurality of contiguous element areas extending in a second direction perpendicular to said first direction.

11. The apparatus of claim 10 wherein said first encoding means includes a plurality of segment encoding means; each of said segment encoding means including a plurality of position switches; and
means in each of said segment encoding means for connecting certain ones of said element areas to said first terminal for displaying a segment pattern in the position identified by a closed one of said plurality of position switches.

12. The apparatus of claim 11 including means for disabling selected ones of said plurality of segment encoding means.

13. The apparatus of claim 8 wherein different ones of said display elements define different colors in said illuminated state.

14. The display apparatus of claim 1 wherein said first plurality of display elements includes first and second terminal elements and one or more intermediate elements disposed therebetween; and wherein said first encoding matrix includes means for recirculating said display pattern by illuminating said first terminal element when the leading edge of said display pattern overflows past said second terminal element.

15. The display apparatus of claim 14 including a second plurality of selectively illuminable display elements substantially contiguously arranged in alignment and including first and second terminal elements and one or more intermediate elements disposed therebetween, each of said elements having first and second electrodes;
means supporting said second plurality of display elements adjacent to said first plurality with said second plurality first terminal element substantially contiguous with said first plurality second terminal elements; and
means connecting said first encoding matrix to said second plurality of display elements in the same manner as said first encoding matrix is connected to said first plurality of display elements.

References Cited

UNITED STATES PATENTS

| | | | |
|---|---|---|---|
| 3,384,888 | 5/1968 | Harnden et al. | 340—339 |
| 3,387,269 | 6/1968 | Hernan et al. | 340—154 |
| 2,995,682 | 8/1961 | Livingston | 315—169 |
| 3,258,628 | 6/1966 | Action. | |
| 3,263,120 | 7/1966 | Aiken | 315—169 |
| 3,327,163 | 6/1967 | Blank | 315—169 |
| 3,328,790 | 6/1967 | Rhodes | 340—324 |
| 3,351,928 | 11/1967 | Smola | 340—324 |
| 3,358,185 | 12/1967 | Lally | 315—169 |

OTHER REFERENCES

Von Zastrow: Power and Control Circuits, Electronics, Dec. 6, 1963, pp. 51–60.

M. M. CURTIS, Assistant Examiner

JOHN W. CALDWELL, Primary Examiner